(No Model.) 3 Sheets—Sheet 3.
H. B. COBB.
CONDUIT FOR UNDERGROUND ELECTRIC WIRES.

No. 294,365. Patented Mar. 4, 1884.

Witnesses:
Chas. E. Gaylord.
Douglas Dyrenforth

Inventor:
Henry B. Cobb,
By Dyrenforth & Dyrenforth,
Att'ys.

UNITED STATES PATENT OFFICE.

HENRY B. COBB, OF WILMINGTON, DELAWARE.

CONDUIT FOR UNDERGROUND ELECTRIC WIRES.

SPECIFICATION forming part of Letters Patent No. 294,365, dated March 4, 1884.

Application filed November 24, 1883. (No model.)

*To all whom it may concern:*

Be it known that I, HENRY B. COBB, a citizen of the United States, residing at Wilmington, in the county of New Castle and State of Delaware, have invented certain new and useful Improvements in Conduits for Underground Electric Wires; and I hereby declare the following to be a full, clear, and exact description of the same.
My invention relates to an improved coupling for the conduit, which shall be adapted to permit the passage through it of the wires without obstruction, also to permit easy access to the wires, and, furthermore, to permit any one or more of them to be diverted to a lamp-post or building for telegraphic or telephonic purposes, or for electric lighting, as the case may be.

My invention consists in employing as a coupling for the conduit, to be applied at proper intervals between the man-holes, a metal body divided longitudinally into separable parts having one or more passages through it for the wires, usually with one or more lateral branch passages for deflecting the wires, each direct passage having a diameter equal to that of the interior of the conduit which enters it, and being enlarged where the conduit-sections enter it to the extent of the thickness of the conduit, to cause the inner surfaces of the conduit and couplings to be flush with each other.

It further consists in the form of coupling which I generally prefer to employ, which, while embodying the foregoing features, comprises three passages, the central one being for through-wires and the side ones for such as are to be tapped at different points; and it consists, also, in the construction which I employ for forming a firm and even joint where it unites with the conduit-sections, as hereinafter more fully set forth.

Figure 1:
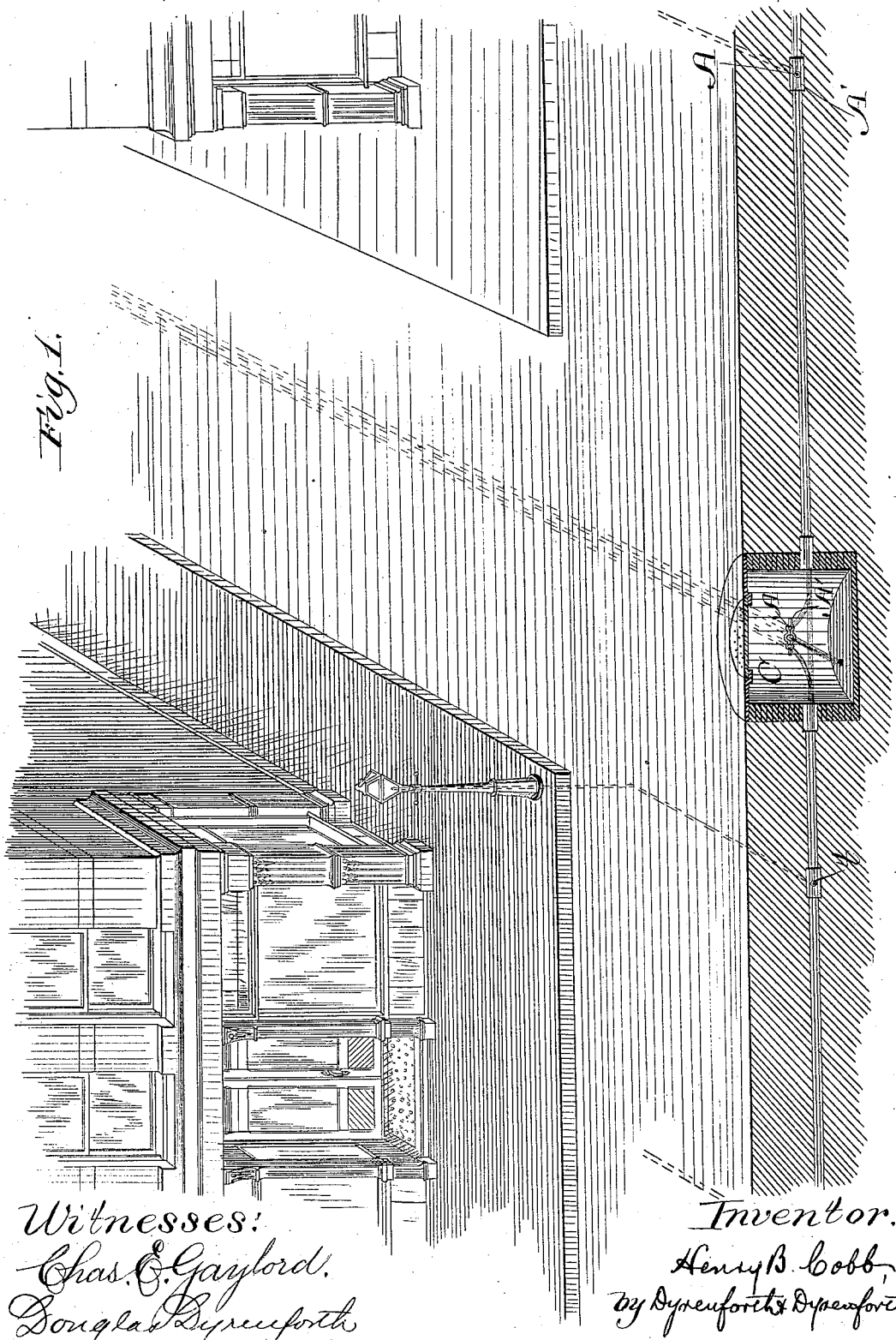
Figure 2:
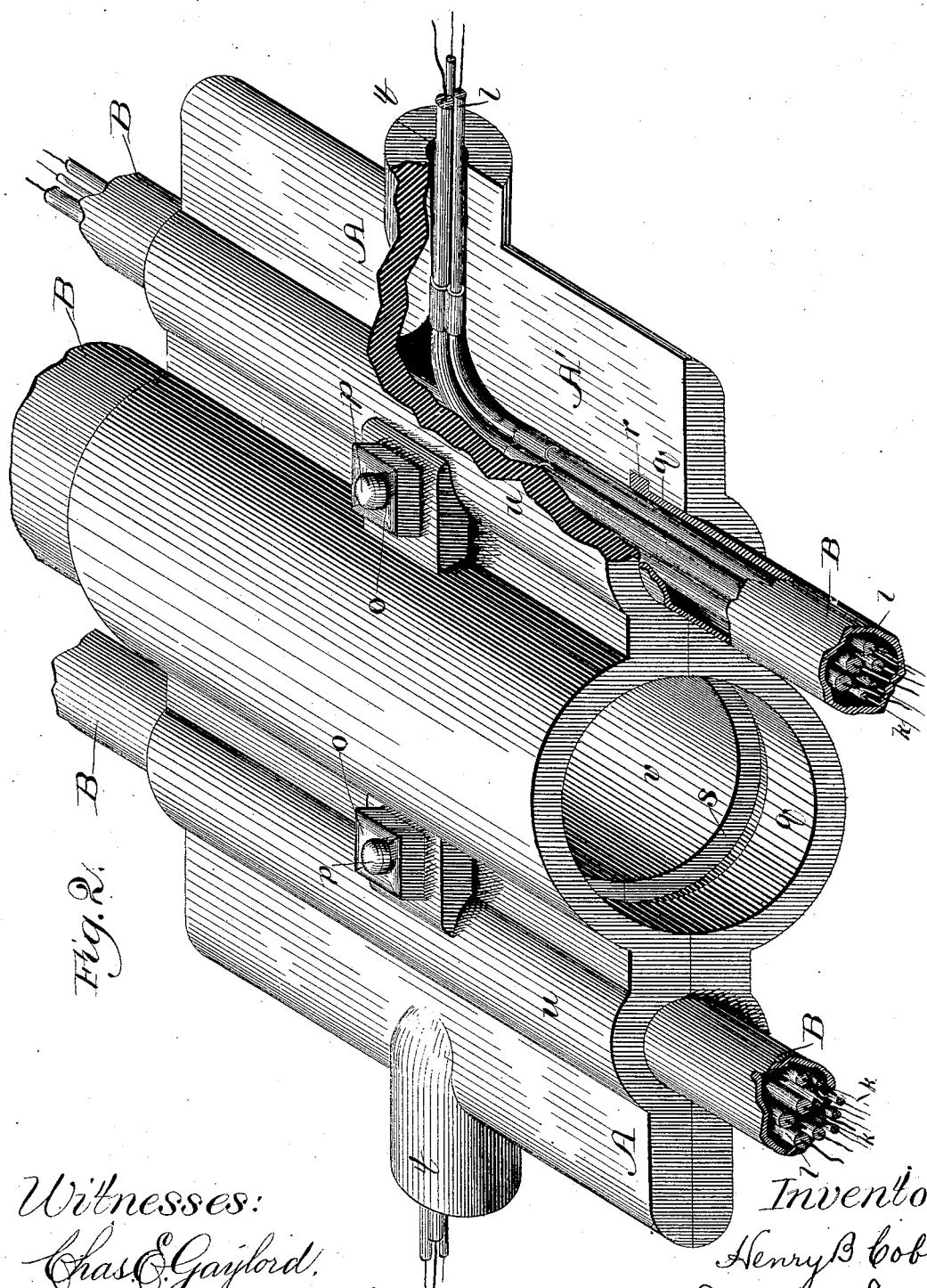
Figure 3:
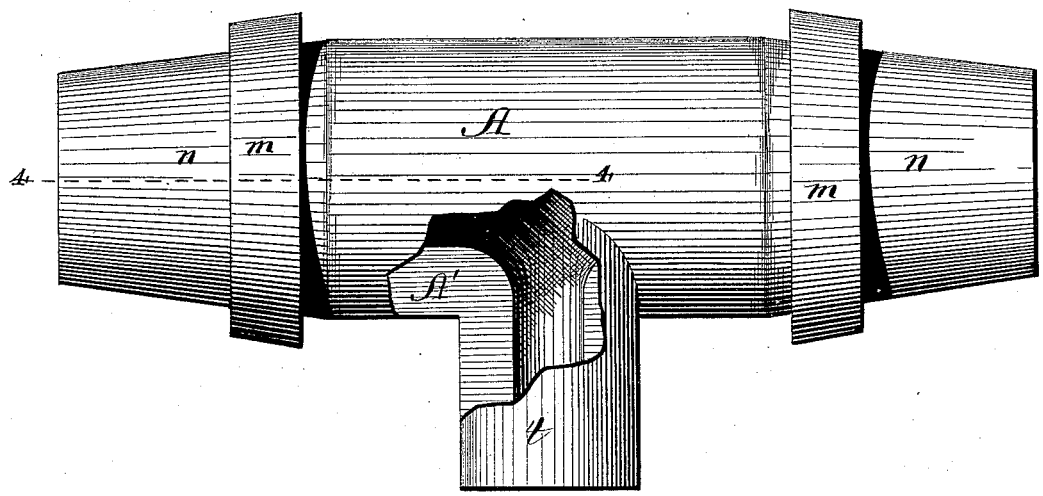
Figure 4:
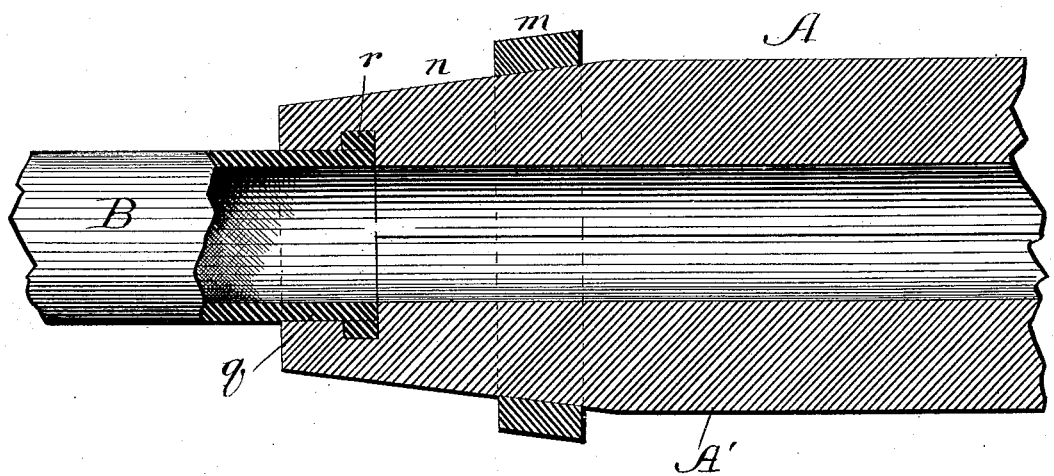

In the drawings, Figure 1 is a sectional and perspective view of a street in which an underground conduit provided with my improvements is laid; Fig. 2, a perspective view of the preferred form of my coupling, having a portion of the upper half broken away; Fig. 3, a plan view of a coupling involving the leading features of my invention, but with only a single passage for the wires. As in the preceding figure, a portion of the upper half is broken away to show the internal construction. Fig. 4 is a longitudinal section taken on the line 4 4, of Fig. 3.

The coupling is cast in two equal and similar parts, A A', as clearly shown in Fig. 2. It is preferred to form it with three passages, to constitute continuations of three separate conduits—to wit, a central passage, $v$, for the through-wires, and two side passages, $u$, for such wires as are to be led off for any purpose, each side passage being provided with a lateral branch, $t$, through which the wires may be turned off. Of course, the relative sizes of all the passages may be varied to suit special requirements. To form a firm and even connection with the ends of the conduits B, the passages are all provided, at a short distance from each end, with annular recesses $s$, to receive flanges $r$ upon the ends of the conduits, and from the recesses to the ends the passages are enlarged to the extent of the thickness of the conduit, as shown at $q$, whereby the inner surfaces of the conduits and passages are flush with each other. Instead of forming the flange $q$ upon the conduit in the manner shown, the conduit may be crimped at the required point, and, if desired, the flanges and the recesses to receive them may be omitted entirely, although it is preferred to employ them.

It is advisable to secure the two parts A and A' together, which may be done by any convenient means, such as the bolts $p$ and nuts $o$.

Where the coupling contains only a single passage, as shown in Figs. 3 and 4, the ends may be made tapering, as shown at $n$, and the parts A and A' be held together by means of collars $m$, fitting upon the tapered ends. The same form of fastening device may be employed with the style of coupling shown in Fig. 2, by tapering the branch tubes $t$ and applying collars thereto.

A form of coupling intermediate between that shown in Fig. 2, on the one hand, and Figs. 3 and 4, on the other, may be found desirable under certain circumstances—that is to say, a coupling with two passages corresponding to the passages $u$, placed immediately adjacent to each other, the central passage, $v$, being omitted.

Fig. 1 shows clearly the manner in which my device is applied. At each street-intersection a man-hole, C, is sunk in the usual manner. The conduits connect these man-holes, and are embedded in the earth at a suitable distance below the surface, the length of the sections being regulated according to circumstances. Wherever it is required to deflect wires to a lamp-post or building, as shown by dotted lines in Fig. 1, the coupling must be employed, and the lengths of the conduit-sections regulated to suit; but the device is equally well adapted to serve as a joint-coupling merely at points where no deflection of the wires is wanted. In the latter case the branches $t$, when employed, may be kept plugged. Where the wires branch off to lamps or buildings, it is desirable to have them pass through tubes forming continuations of the branches $t$.

The device above described, including the conduit, may be employed for underground electric wires of every character, whether insulated and provided with a metal sheathing over the insulator, or insulated alone without the metal sheathing. It is designed by me especially for use in connection with the tubular metal-coated insulator which forms the subject of Letters Patent No. 288,310, granted to me November 13, 1883. Thus used, the laying of underground wires becomes a matter of great simplicity, the tubes $l$, formed in short lengths, being pushed through the conduits from the man-holes, and successively coupled as they are pushed along, and the wires $k$, being subsequently pushed through the tubes from man-hole to man-hole, by means of a device for the purpose, which forms the subject of a separate application for a patent. When it is desired to deflect a wire at any point in the process of laying, the upper part of the coupling is removed, and a person stationed at the coupling, seeing the tube or wire as soon as it reaches that point, stops it and makes the proper connections. In this case the continuation of the wire and tube beyond the coupling would be pushed through the conduit from the next man-hole in a contrary direction from the first. The wires may, however, be passed continuously from man-hole to man-hole and subsequently tapped. Where the wires are laid continuously from man-hole to man-hole in the first instance, my coupling affords great facility in the matter of tapping, it being only necessary to dig down to the proper coupling and remove the upper part, thus exposing the wires, and then proceed in the usual manner. It will be seen that if an obstruction were formed by making the passage either broader or narrower than the interior of the conduit which enters it, the passing through of the wires would become difficult, if not impossible.

It is of course desirable, in laying the conduits, to adopt some mark or system whereby the exact location of any coupling may be discerned or readily ascertained.

What I claim as new, and desire to secure by Letters Patent, is—

1. A coupling for conduit-sections in underground systems of electric wires, comprising a metal body divided longitudinally into separable parts, and having one or more passages through it to receive the ends of the conduit-sections and form continuations thereof, the diameter of each passage corresponding with the interior diameter of the conduit-sections which enter it, and being enlarged where the conduit-sections enter it to the extent of the thickness of the metal of the said conduit-sections, substantially as described, and for the purpose set forth.

2. A conduit-coupling comprising the separable parts A and A', provided with three longitudinal passages, $u$ $u$ and $v$, each having a diameter equal to the interior diameter of the conduit-sections which enter it, and enlarged where the conduit-sections enter it to the extent of the thickness of the metal of the said conduit-sections, and provided, also, with lateral passages $t$, leading from the passages $u$, substantially as described.

3. A coupling for conduit-sections, comprising a metal body formed of the separable parts A and A', with mechanism for securing said parts together, and having one or more longitudinal passages through it to receive the ends of the conduit-sections and form continuations thereof, and provided with annular recesses $s$ near the ends of the passages, to receive flanges $r$ on the ends of the conduit-sections, and having the passages from the said recesses to the ends made larger than elsewhere, whereby the inner surfaces of the conduit-sections and coupling may be flush with each other, substantially as described.

HENRY B. COBB.

In presence of—
C. C. LINTHICUM,
DOUGLAS DYRENFORTH.